(No Model.)
P. F. HELLERSTEDT.
TWO WHEELED VEHICLE.
No. 311,244. Patented Jan. 27, 1885.
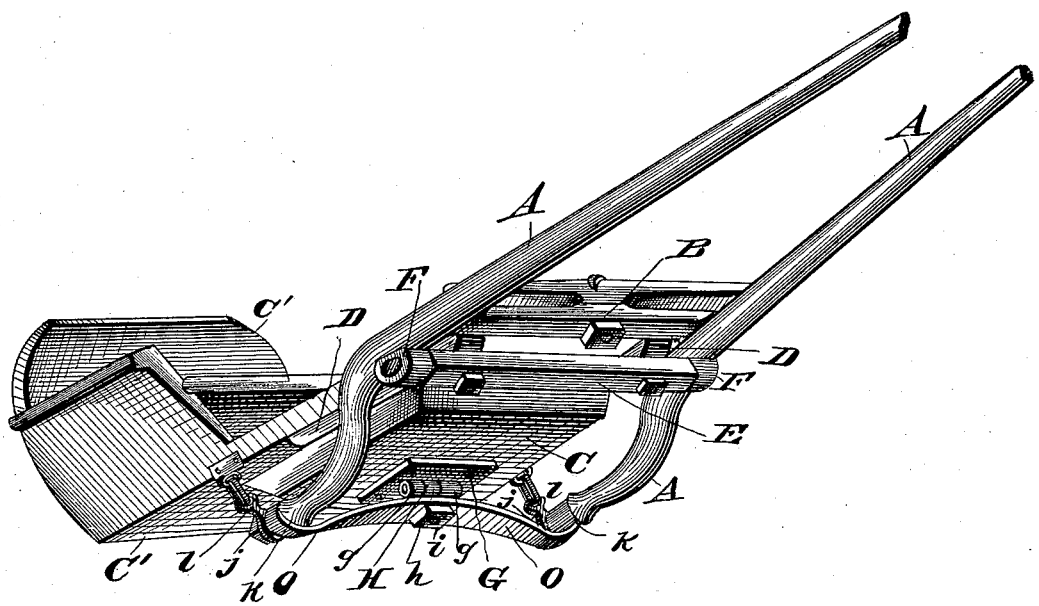
WITNESS
INVENTOR
Peter F. Hellerstedt
by: Manahan & Ward ATTORNEYS.

UNITED STATES PATENT OFFICE.

PETER F. HELLERSTEDT, OF MORRISON, ILLINOIS.

TWO-WHEELED VEHICLE.

SPECIFICATION forming part of Letters Patent No. 311,244, dated January 27, 1885.

Application filed August 27, 1884. (No model.)

*To all whom it may concern:*

Be it known that I, PETER F. HELLERSTEDT, a citizen of the United States, residing at Morrison, in the county of Whiteside and State of Illinois, have invented certain new and useful Improvements in Two-Wheeled Vehicles; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to that class of land conveyances denominated "road-carts;" and it consists of a body mounted upon two wheels and with such a relation of axle, springs, and shafts as will be most conducive to lightness of draft, safety, and comfort.

In the drawing, the figure is an oblique view of part of the gearing of a cart embodying my invention, the axle, springs, and wheels being removed.

A A are the shafts, provided with the stationary cross-piece B, and extended rearwardly to a point on each side the body, about opposite the transverse center of the foot-magazine C.

To each side of the body C' and bolted thereto are the body-loops D D, which extend forward and are rigidly connected by bolts or otherwise to a cross-bar, E, which in turn is journaled into the under face of the shafts A A by means of the boxes F F, which are firmly bolted to the latter.

At a point on the bottom of the foot-magazine C of the body C' equidistant between the rear points of the shafts A is attached a square or oblong plate, G, furnished with the perforated lugs *g g*, between which lugs, by means of an ordinary bolt through the same, is swung the eyebolt *h*, thus forming the hinge H.

O is a flat, wide steel spring attached by means of a hole through its center to the eyebolt *h*, and held rigidly against a shoulder on said eyebolt by the nut *i*, the outer ends of the spring O being coiled from below around the rear end of each shaft in a depression formed in the latter for that purpose and held against the shoulder *k*, formed by such depression in the shaft A, by the nut *j*, the stay-loop *l* (shown in the drawing) acting as a washer against the edge of the spring O.

Any of the known methods may be used for fastening the bed to the axle, and any desired form of spring may be used.

I am aware that a great number of inventions in the same line with mine have been patented, and many of them are in use.

The use of two-wheeled vehicles has developed the fact that great difficulty has been experienced in avoiding or getting rid of what is known as the "horse-motion," and my efforts have been exerted particularly in that direction. As will be seen in my invention, the shafts A A are pivotally connected to the body C by means of the journaled shaft E and body-loops D D, and are also connected to the body C by means of the spring O and hinge H. Ordinarily the motion of the horse is by means of the shafts imparted to the body of the vehicle, such motion being found to be very unpleasant and irritating. By means of my devices such motion is counteracted and not felt by the occupants of the vehicle. The shafts A being by means of the spring O, plate *g*, and eyebolt *h*, hinged to the body, the motion of the horse is imparted through the shafts and spring to the hinge H, and as a consequence the upward and downward motion of the horse, instead of creating a like motion to the body C, imparts a forward and backward motion to the hinge H, and thus not only protects the occupant from the disagreeableness of such motion, but also releases the spring O from any strain, and prevents its creaking where attached to the ends of the shafts A.

What I claim as my invention, and desire to secure by Letters Patent of the United States, is—

1. The shafts A A, cross-bar E, journaled therein, body-loops D D, spring O, and hinge H, all arranged substantially as described, and for the purpose mentioned.

2. The body C, hinge H, spring O, and shafts A, the latter being pivotally connected to the cross-bar E, substantially as shown, and for the purpose specified.

In testimony whereof I affix my signature in presence of two witnesses.

PETER F. HELLERSTEDT.

Witnesses:
GEO. W. CHAMBERLIN,
ISAAC I. BUSH.